United States Patent [19]

Grinwald

[11] Patent Number: 4,693,164
[45] Date of Patent: Sep. 15, 1987

[54] MINE ROLLER ATTACHMENT TO TANK
[75] Inventor: Israel M. Grinwald, Oakland, Mich.
[73] Assignee: The United States of America as represented by the Secretary of the Army, Washington, D.C.
[21] Appl. No.: 870,063
[22] Filed: May 22, 1986
[51] Int. Cl.⁴ .............................................. F41H 11/12
[52] U.S. Cl. ...................................... 89/1.13; 280/481; 280/504; 294/82.31
[58] Field of Search ........................ 89/1.13; 294/82.31, 294/82.3, 104; 280/504, 481

[56]  References Cited

U.S. PATENT DOCUMENTS

| | | | |
|---|---|---|---|
| 2,221,492 | 11/1940 | Sawyer | 280/504 |
| 2,482,741 | 9/1949 | Carmichael | 280/504 |
| 2,500,064 | 3/1950 | Foster | 280/504 X |
| 3,454,296 | 7/1969 | Long | 294/82.31 |
| 3,690,713 | 9/1972 | Ristow | 294/82.31 |
| 3,873,146 | 3/1975 | Houshar | 294/82.3 |
| 3,964,777 | 6/1976 | Lindgrist | 294/82.31 X |
| 4,173,196 | 11/1979 | Casad et al. | 294/82.31 |

Primary Examiner—David H. Brown
Attorney, Agent, or Firm—Peter A. Taucher; John McRae

[57] ABSTRACT

Mechanism for attaching a military mine roller to the front end of a military tank. Latch structures of simplified design are utilized to minimize the adverse effects of manufacturing tolerances on latch structure performance. Each latch structure includes an arcuate curved surface partially encircling a pin means carried by the mine roller, whereby the pin means is firmly retained against escape from the latch structure.

1 Claim, 7 Drawing Figures

MINE ROLLER ATTACHMENT TO TANK

GOVERNMENT INTEREST

The invention described herein may be manufactured, used, and licensed by or for the Government for governmental purposes without payment to me of any royalty.

BACKGROUND AND SUMMARY OF THE INVENTION

This invention relates to mechanism for attaching a mine roller assembly to a military tank. A mine roller assembly is a device that is pushed along the ground in front of a tank to explode enemy mines laid in the ground or merely lying on the ground.

The mine roller assembly comprises a number of heavy steel rollers oriented alongside one another, with little or no spacing between the rollers; individual rollers are floatably mounted so that each roller exerts its full weight on the terrain. As the roller device is pushed forward, the individual rollers depress the earth to detonate any enemy mines therebeneath.

Detonation forces of exploding mines cause the rollers to be lifted from the earth surface. Considerable strain is placed on the roller suspension mechanisms and the connections between the mine roller and tank.

The present invention relates to a simple low cost attaching mechanism for connecting the mine roller to the tank. A particular object is to provide an attaching mechanism that will withstand blast forces, without permitting the mine roller device to become detached from the tank. The attaching mechanism includes a novel latch structure of simplified design.

THE DRAWINGS

FIG. 2 shows the mechanism in the detached condition, whereas FIG. 1 shows the mechanism in the attached (latched) condition.

PRIOR ART ARRANGEMENT

Figure 1:
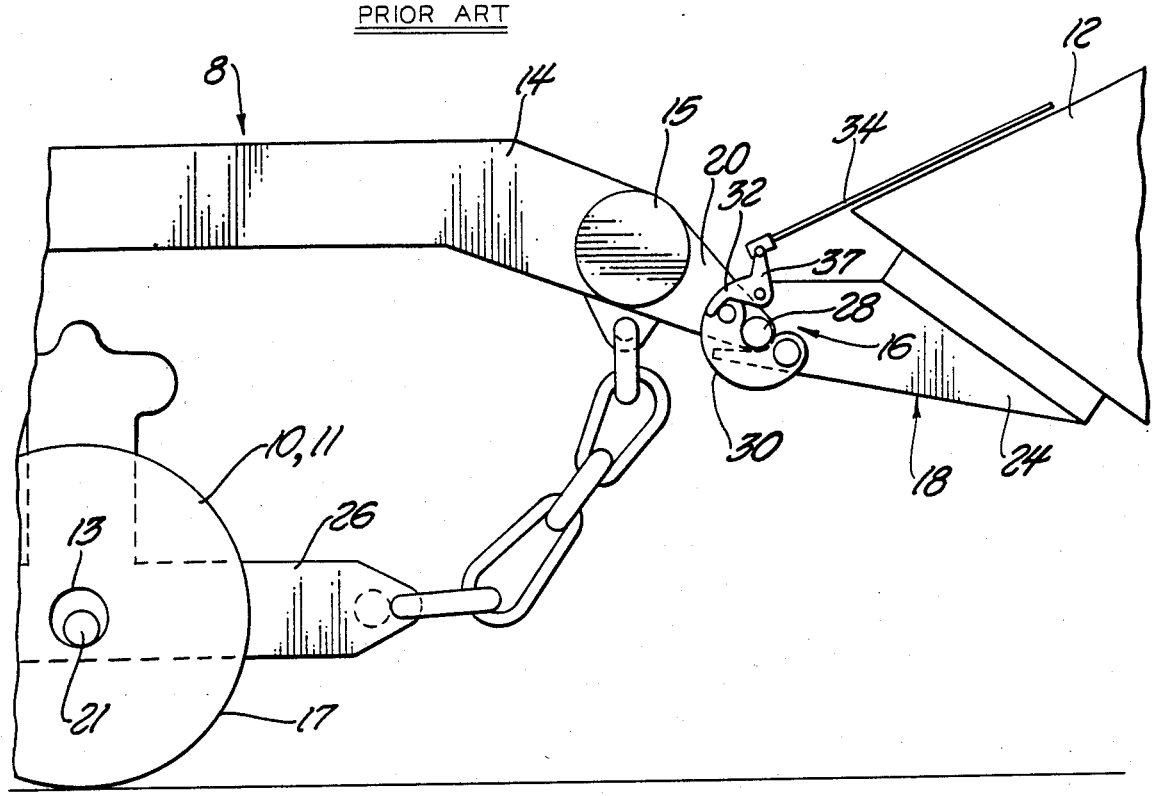
FIGS. 1 and 2 are fragmentary side elevational views of a conventional mechanism for attaching a mine roller assembly to the front end of a military tank.
Figure 2:
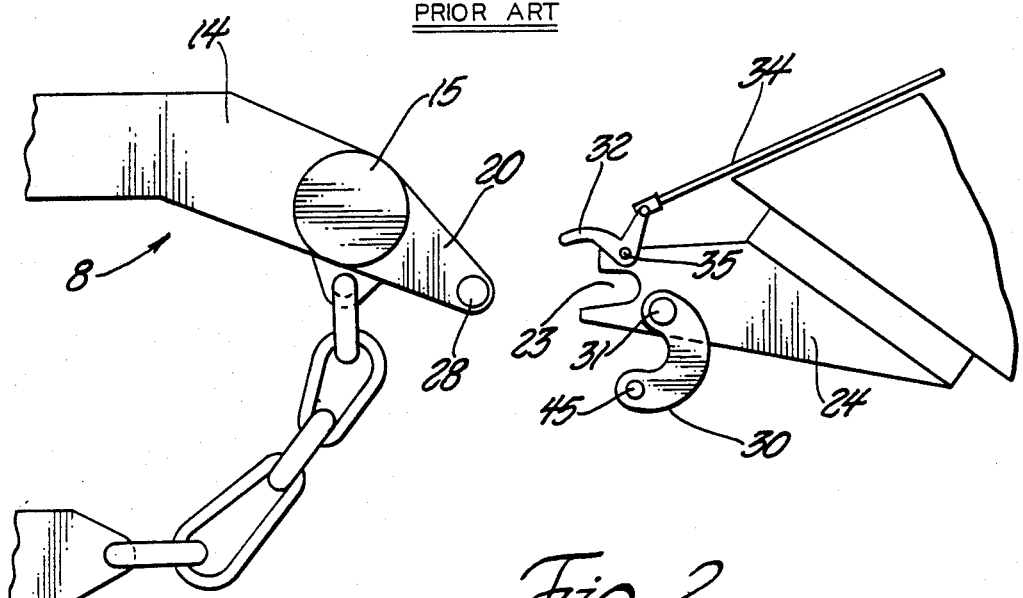
Figure 3:
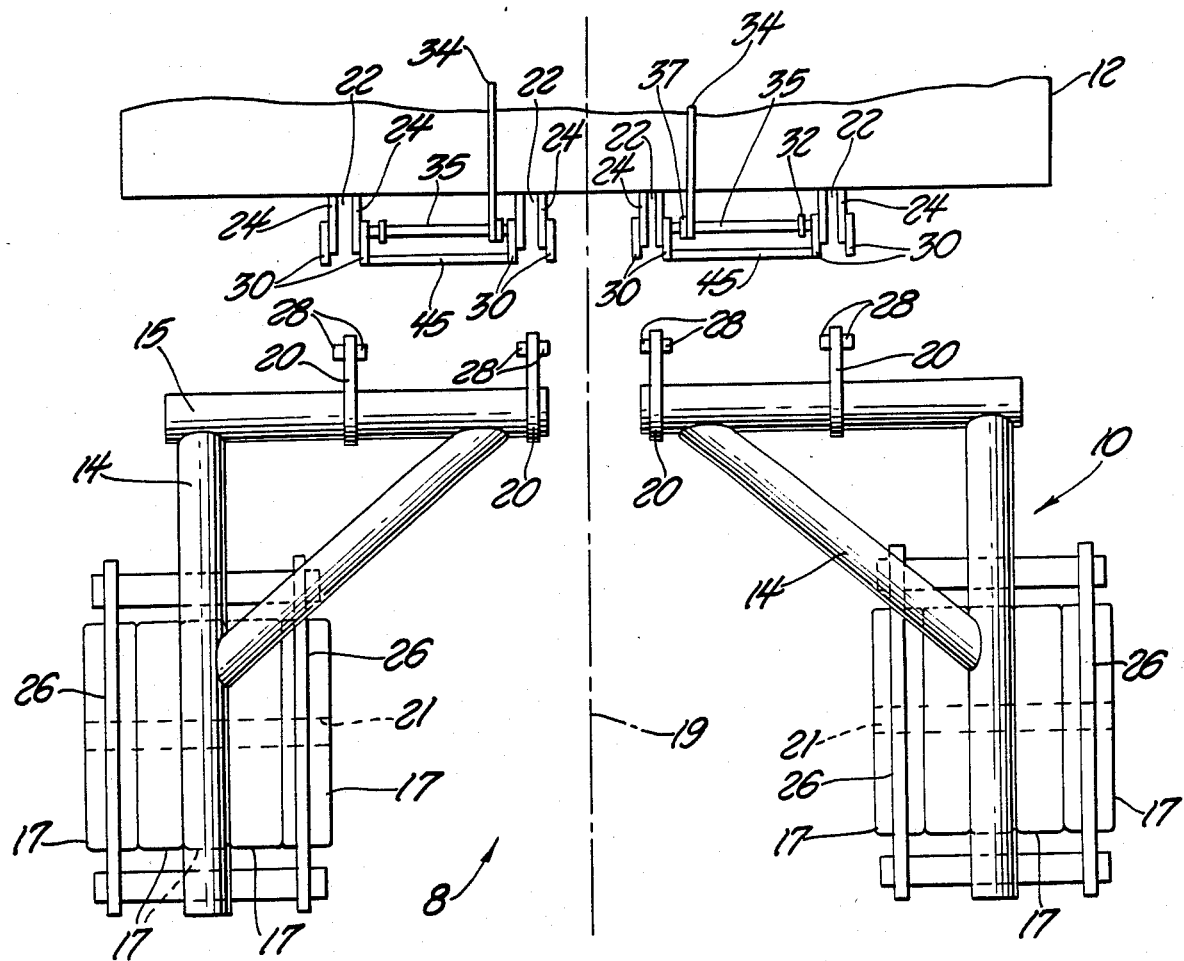
FIG. 3 is a top plan view of the FIG. 2 mechanism.

FIGS. 1 through 3 show a conventional mine roller system 8 attachable to the front end of a military tank 12. The system comprises two separate mine roller assemblies of mirror image (left and right hand) configuration offset laterally from the tank longitudinal centerline 19. In FIG. 3 numeral 1 designates one of the mine roller assemblies.

Figure 4:
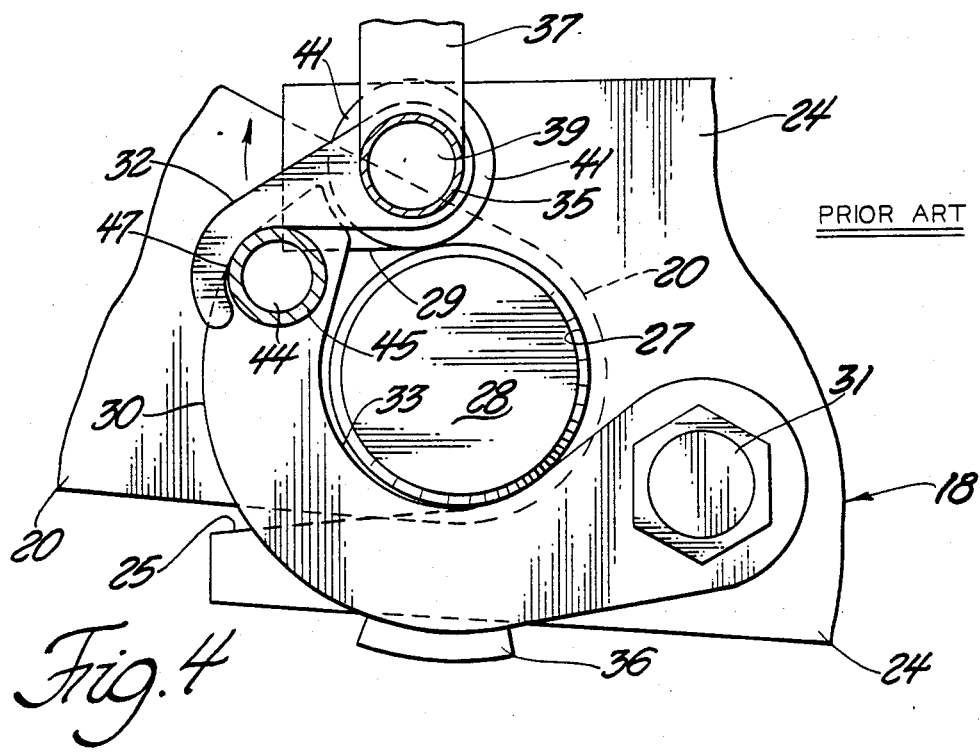
FIG. 4 is a side elevation of the FIG. 1 mechanism enlarged to show structural details.

Each mine roller assembly includes a pusher beam 14 extending generally horizontally above the associated mine rollers. Each pusher beam includes a transverse tube (pipe) 15 having two plate-like arms 20 extending in vertical planes at the rear end of the assembly. Each arm 20 is equipped with two laterally extending pins 28 of circular cross section. The pins have diameters that are slightly less than the width dimensions of notches 23 formed in the front (leading) edges of bracket walls 24 suitably affixed to the front end of tank 12. As seen in FIG. 4, notch 23 is defined by a semi-circular rear surface 27, a generally horizontal upper surface 29, and a generally lower surface 25.

As best seen in FIG. 3, there are eight walls 24 (four for each mine roller assembly). These bracket walls are arranged in pairs to define narrow spaces 22 slightly wider than the thickness dimensions of arms 20. When tank 12 is moved forwardly toward one of the mine roller assemblies (10 or 11), arms 20 enter into spaces 22; at the same time pins 28 move into notches 23. FIG. 2 shows the condition prior to forward movement of the tank, whereas FIG. 1 shows the condition after the tank has moved forward. During such motion of the tank, the pusher beam 14 is chain-suspended from a non-illustrated hoist. The hoist may be adjusted slightly up or down to facilitate horizontal alignment of pins 28 with notches 23.

Each pair of plates 24 has two pin-retainer plates 30 swingably attached thereto for movement from a lowered position (FIG. 2) to a raised position (FIG. 1). In their raised positions, plates 30 prevent pins 28 from movement out of notches 23. In their lowered positions, plates 30 permit pins 28 to be moved out of notches 23, e.g., by backing tank 12 away from the mine roller assembly.

Figure 5:
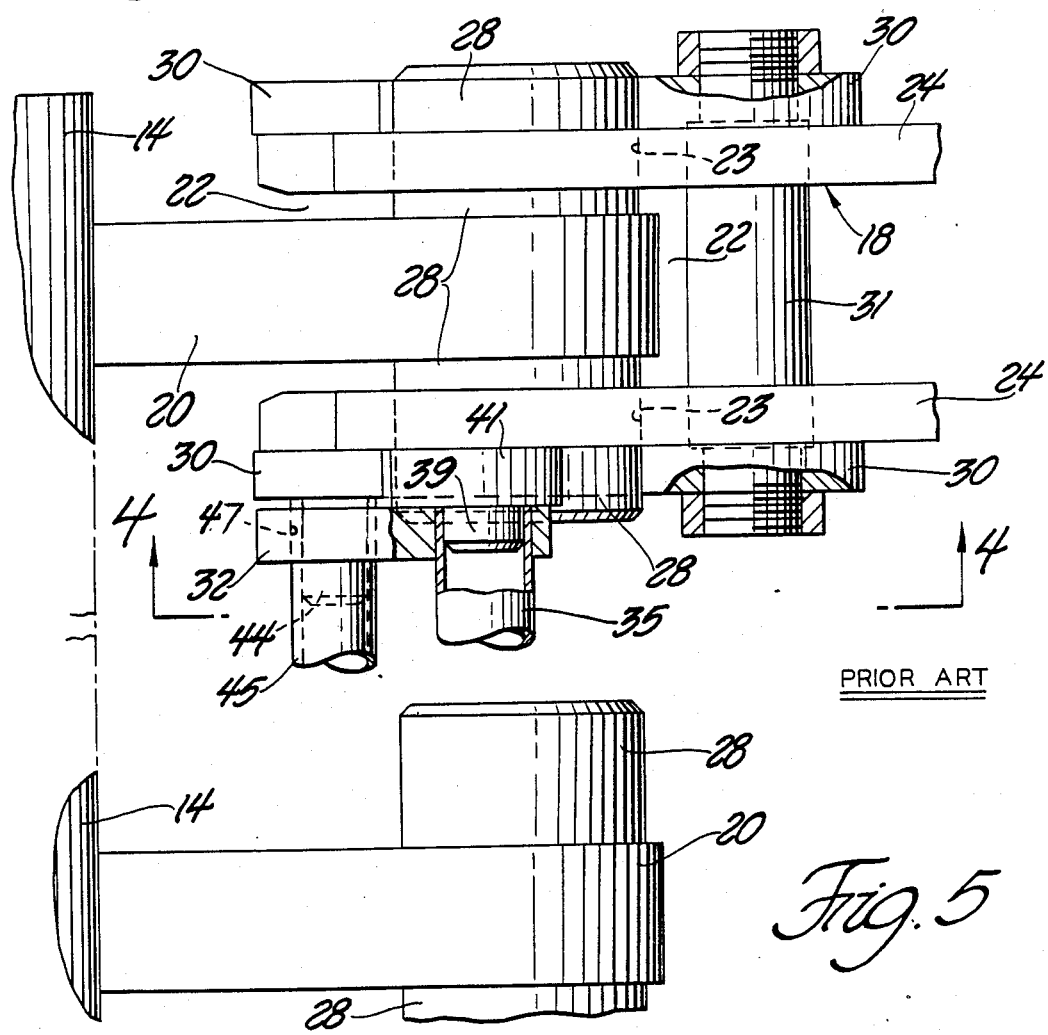
FIG. 5 is a top plan view of the FIG. 4 mechanism.

As best seen in FIG. 5, each pair of plates 30 is suitably affixed to a transverse bolt or shaft 31 that freely extends through circular holes in plates 24. A transverse bar 36 (FIG. 4) interconnects the two retention plates 30, such that the plates and bolt 31 are enabled to swing around the bolt axis as a unit.

As best seen in FIG. 3, a bar 45 extends between the two innermost plates 30 in each set of plates. Each bar 45 serves as a handle or gang actuator to facilitate manual motion of four plates 30 between their raised and lowered positions. As seen in FIG. 5, a pin 44 extends from plate 30 to locate the end of hollow bar 45 on plate 30.

Each set of plates 30 is retained in its raised position (FIG. 1 and FIG. 4) by means of two latch structures 32 affixed to a transverse tube 35. Tube 35 has opposite end areas thereof rotatably mounted on stub shafts 39 extending from bosses 41 that are welded to side surfaces of plates 24. Tube 35 and the associated latch structures 32 are rotatable as a unit around the axis of stub shafts 39.

A crank arm 37 is affixed to each tube 35 to facilitate tube rotation. The upper (non-illustrated) end of each crank arm 37 has a pivotal connection with a tie rod 34 that extends along the upper surface of the tank hull. The remote end of the tie rod is accessible to the tank driver, whereby the associated arm 37 can be operated by the driver without his having to disembark from the tank.

Tie rod operation is especially useful when it is desired to disconnect the mine roller assemblies from the tank without exposing the crew to enemy fire, e.g., when one or both mine roller assemblies have been damaged by mine blast forces. A pulling action on tie rod 34 causes two latches 32 to be lifted out of engagement with bar 45, enabling the associated plates 30 to gravitationally swing down to the FIG. 2 condition. The tank can then be backed away, leaving the mine roller assembly on the battlefield.

During mine-clearing operations, the tank pushes the two mine roller assemblies over enemy terrain. The heavy steel rollers 17 have enlarged circular holes 13 (FIG. 1) encircling a transverse shaft 21 carried by carriage walls 26. Heavy rollers 17 exert pressure on the terrain to explode enemy mines.

As the rollers move over rough terrain each mine roller assembly undergoes a hinge-like motion around the axis defined by the associated pins 28. To accommodate the necessary pin 28 rotation the rear surfaces 27 of notches 23 and the upper surfaces 33 of plates 30 are curved to conform to the surface contours of pins 28. The surface contours permit the mine roller assemblies to swing up and down around the pin 28 axis.

When heavy rollers 17 encounter a mine the entire mine roller assembly 10 or 11 is lifted off the ground. Considerable stress is placed on each pin 28. The pin forcibly engages notch surface 27 and rebounds against surface 33 of the associated plate 30. Latch structure 32 is not believed to be fully effective to hold arm 30 in its raised locked position. The force of pin 28 on surface 33 is transmitted through bar 45 onto latch surface 47 (FIG 4). Latch structure 32 only partially surrounds bar 45 such that bar 45 can possibly cam downwardly along latch surface 47; in that event plates 30 will swing down to the open position (FIG. 2). This is very undesirable since the mine roller assembly is then no longer operatively connected to the tank.

Figure 6:
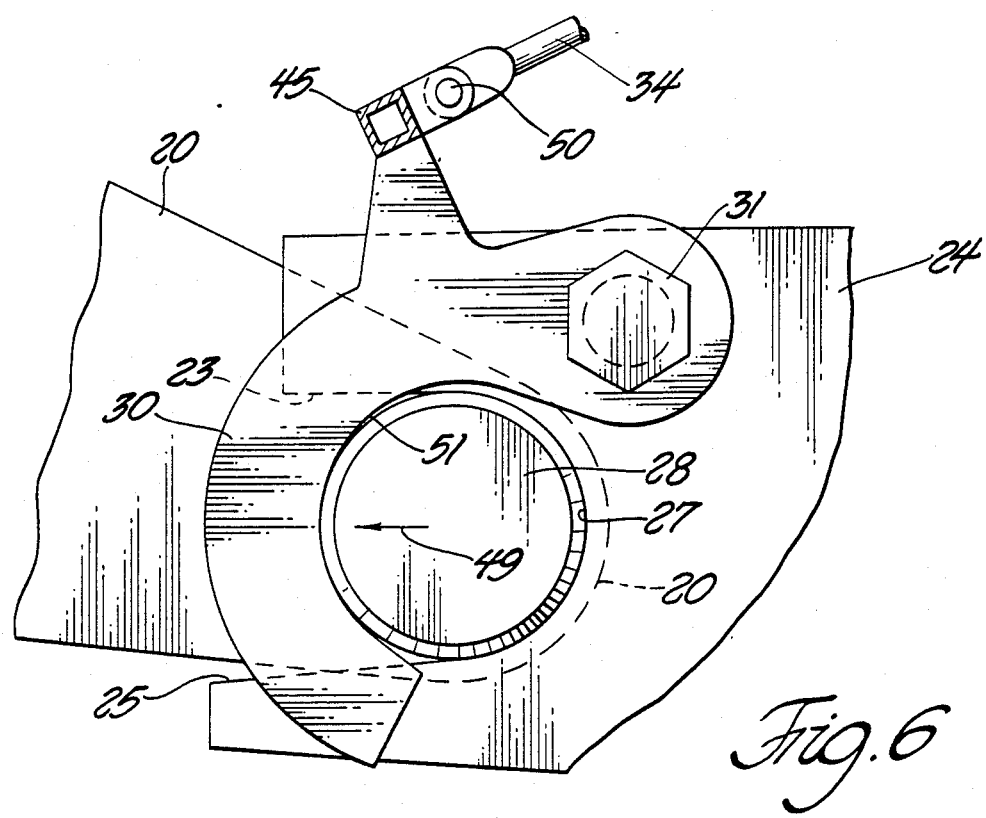
FIG. 6 is a side elevational view of an attaching mechanism constructed according to my invention.
Figure 7:
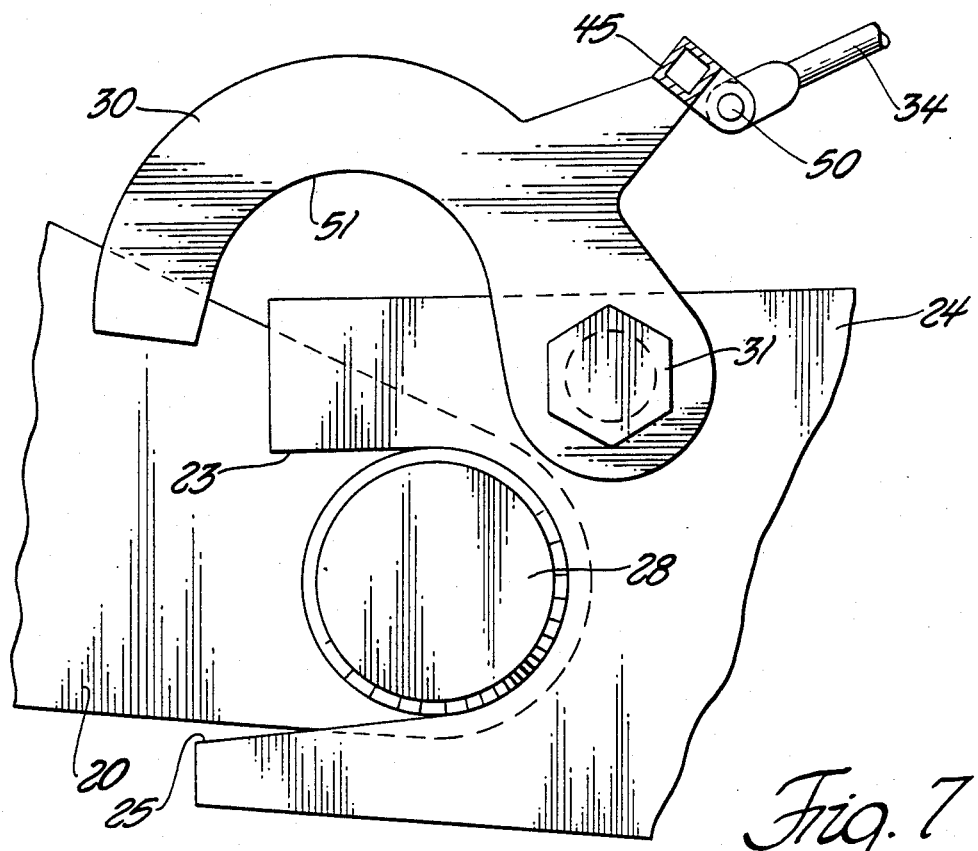
FIG. 7 is a view similar to FIG. 6, but showing a latch structure in a raised unlatched condition.

The possibility for this undesired action is increased by the effects of manufacturing tolerances on component orientations; e.g., any non-parallelism of bolt 31, bar 45 and tube 35, or any variation in spacing between these components. My invention, as shown in FIGS. 6 and 7, is designed to avoid the "loose latching" condition that can occur with the conventional arrangement depicted in FIGS. 1 through 5.

INVENTIVE ARRANGEMENT

In my proposed arrangement, the pin-retention function and latch function are combined in retainer plates 30; there are no separate latch structures 32. The retainer plates are affixed to bolts 31 in the same fashion as shown in FIG. 5. In this case, however, the pivot axis defined by each bolt 31 is located above and behind the associated notches 23 in associated bracket walls (plates) 24. Walls 24 are spaced and located the same as shown in FIG. 3, i.e., there are eight such walls; four walls for supporting mine roller assembly 10 and four walls for supporting mine roller assembly 11.

Each retainer plate 30 has a concave semi-circular undersurface 51 adapted to conform to the contour of the associated pin 28. The plates in each set of four plates 30 are welded to a transverse bar 45. The bar has a pivotal connection 50 with a tie rod 34. There are two tie rods 34 located to overlie the tank hull upper surface as shown in FIGS. 1 through 3. The tie rods function in essentially the same fashion as the tie rods shown in FIGS. 1 through 3. The tie rods are normally locked to the hull when plates 30 are in their FIG. 6 closed positions, whereby the tie rods prevent plates 30 from vibrating.

The pin-retention action of the FIG. 6 plates 30 is believed to be better than that of the FIG. 4 structures (plate 30 and latch structure 32). In order for pin 28 (FIG. 6) to slip out of notch 23, it must exert a force on plate 30 in the direction of arrow 49. Plate surface 51 encircles the pin 28 surface such that the pin is unable to exert a cam force on surface 51 sufficient to let the pin work out of notch 23. In this connection, it will be seen that in the FIG. 6 arrangement the portion of curved surface 51 below direction line 49 underlies the curved surface of associated pin 28. Any horizontal forces generated by an exploding mine in the arrow 49 direction cannot lift retainer plate 30 from its FIG. 6 lowered position because pin 28 acts as an obstruction to upward motion of plate 30.

The pin-retention action of the FIG. 6 plate 30 is enhanced by the fact that manufacturing tolerances (variations) are not likely to have any appreciable adverse effect on latch action. The pivot holes for plates 30 can be accurately located relative to notches 23 without a great deal of difficulty. No tolerance stack-ups are involved, as in the case with the arrangement of FIGS. 1 through 5.

I wish it to be understood that I do not desire to be limited to the exact details of construction shown and described for obvious modifications will occur to a person skilled in the art, without departing from the spirit and scope of the appended claims.

I claim:
1. In association with a military tank: a mine roller mechanism, and means for attaching the mine roller mechanism to the tank front end; said attaching mechanism comprising a plural number of vertical bracket walls (24) carried on the tank front end, each bracket wall having a leading edge formed with a horizontal notch (23) therein; each notch having a concave semi-circular rear surface 27, a generally horizontal upper surface (29), and a generally lower horizontal lower surface (25). Said attaching mechanism further comprising a plural number of arms (20) extending rearwardly from the mine roller mechanism for individual entry into spaces between adjacent ones of the bracket walls, each arm having a pair of laterally-extending pins (28) sized to extend into a notch in a bracket wall, each pin having a circular cross section conforming to the aforementioned concave surface (27): the improvement comprising a simplified latch structure for retaining the pins in the notches; said latch structure including a plural number of hook-shaped retainer plates (30) swingably attached to the aforementioned bracket walls on a pivot axis located substantial distances above and behind the aforementioned notches; and a horizontal transverse operator bar (45) interconnecting said retainer plates for conjoint movement; said transverse bar being located above and in front of the aforementioned pivot axis; each retainer plate having a concave semi-circular undersurface (51) conforming to the front surface contour of the associated pin, whereby the retainer plates can be swung downwardly from raised positions above the notches to lowered positions wherein the concave undersurfaces prevent withdrawal of the pins out of the notches; each concave semi-circular undersurface (51) including a surface section that underlies a curved surface of the associated circular pin (28) when the retainer plates are in their lowered positions, whereby mine-explode forces cannot act through said pins (28) to lift the retainer plates from their lowered positions.

* * * * *